INVENTOR.
Tom Addison
James K. McBeth

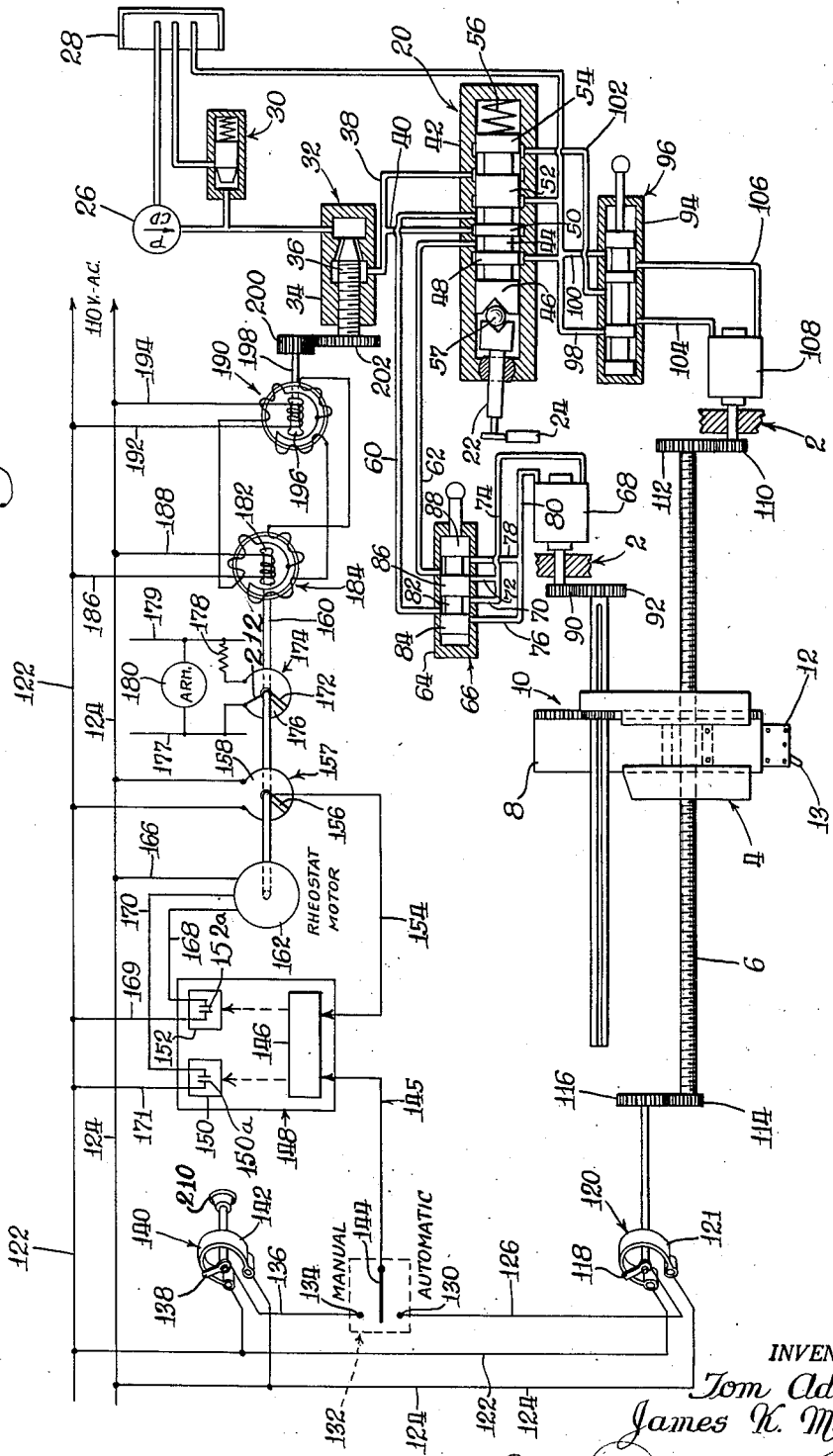

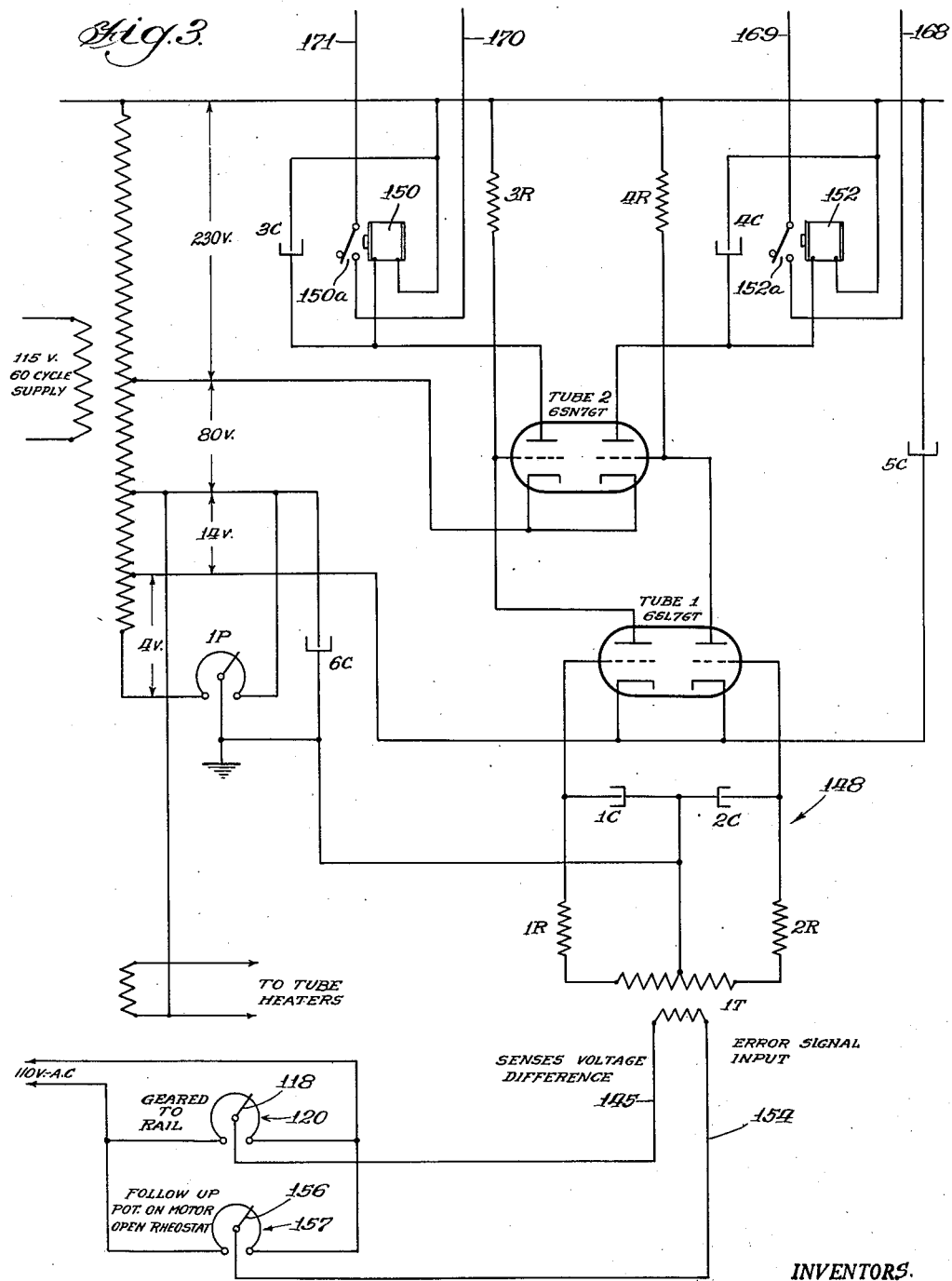

United States Patent Office 2,796,793
Patented June 25, 1957

2,796,793

FEED RATE CONTROL

Tom Addison and James K. McBeth, Cincinnati, Ohio, assignors to American Steel Foundries, Chicago, Ill., a corporation of New Jersey Application December 9, 1952, Serial No. 324,923

10 Claims. (Cl. 82—14)

This invention relates to boring mills and more particularly to a vertical boring mill having a rotatable worktable and one or more tool carrying slides or rams for moving the cutting tools into or across the workpiece. In mills of this type the travel of the tool relative to the work is generally termed "feed per revolution," meaning that for each revolution of the worktable, the tool slide moves some pre-selected distance.

In prior art boring mills, this relationship of tool movement to worktable revolutions is commonly obtained by driving both the table and the tool actuating ram from a common power source with suitable variable reduction means in the drive to the tool actuating ram for selecting the desired feed per revolution.

In such prior art mills, the cutting speed or rate at which metal is removed from the workpiece has been maintained at a constant rate by accelerating the table speed as the tool slide moves toward the rotational axis of the table.

However, the application of hydraulic contouring attachments to such prior art machines has resulted in severing the usual mechanical connection from the main table drive motor to the means which actuate the tool ram; and the ram actuating means have been connected to a hydraulic motor controlled by a tracer valve having a stylus passing over a template. In such arrangements, the flow rate of oil through the tracer valve to the hydraulic motor has been determined by the manual setting of a hydraulic flow control or rate valve, so that the feed rate of the tool slide having been selected by the setting of the flow control valve remains constant in inches per minute independent of table speed changes.

A primary object of the present invention is to accomplish control of the hydraulic flow rate to the hydraulic motor which drives the ram actuating means, so as to maintain a constant tool feed per revolution relationship regardless of variations in the rate of table rotation.

A more specific object of the invention is to devise a control system such as above described wherein a feed screw for actuating the ram is connected to means for automatically increasing the speed of table rotation as the tool moves toward the rotational center of the table, and other means are provided for automatically increasing the feed rate of the screw as the rotational speed of the table increases.

A further object of the invention is to devise a control system such as above described wherein the hydraulic connections between the flow control valve and the hydraulic motor which drives the feed screw pass through a tracer valve having means for slowing or entirely stopping the hydraulic motor in response to upward or downward movement of the tracer valve stylus on its template accompanied by corresponding upward or downward movement of the tool with respect to the workpiece on the table.

Still another object of the invention is to regulate the flow control valve by connecting thereto the armature of a selsyn motor arranged in series with another selsyn motor having its armature connected for movement in unison with the sliding contact of a rheostat which regulates the speed of the main drive motor for the table, so that an increase in the speed of table rotation is automatically accompanied by an increase in the rate of flow through the flow control valve, and similarly a decrease in the speed of table rotation is accompanied by a corresponding decrease in the rate of flow through the flow control valve.

The foregoing and other objects and advantages of the invention will become apparent from a consideration of the following specification and the accompanying drawings, wherein:

Figure 2 is a diagram illustrating the novel control system in detail, and

Figure 3 is a diagram illustrating the internal wiring of the electronic control device.

Figure 1:
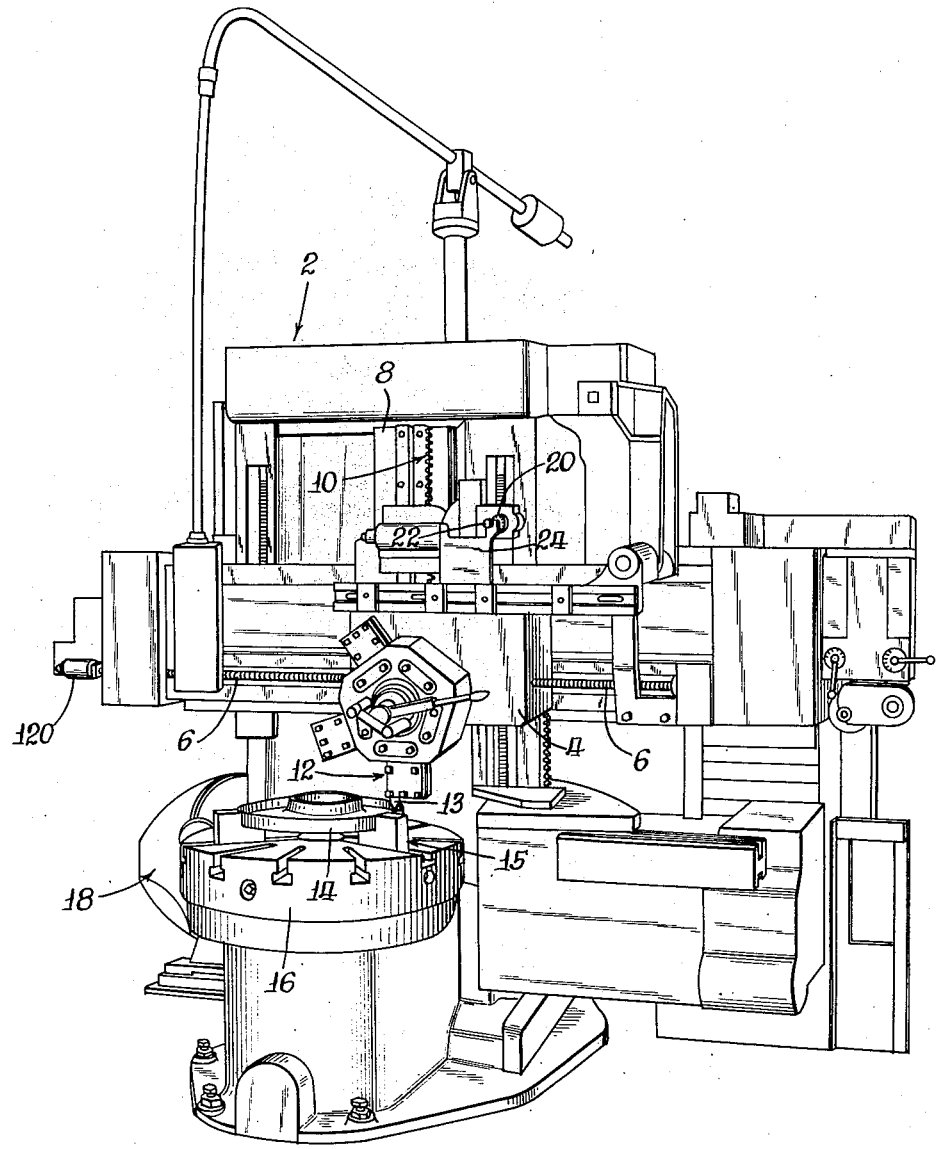
Figure 1 is a general assembly perspective view of a vertical boring mill embodying the invention.

Describing the invention and referring first to the general assembly view of Figure 1, the novel control system is applied to a conventional boring mill comprising a frame 2 carrying a horizontally movable saddle 4 actuated by a feed screw 6. The saddle 4 supports a vertical slide or ram 8 for vertical movement in the usual manner by means of a conventional rack and pinion actuating mechanism 10.

The ram 8 carries a tool holder 12 which supports a tool 13 for engagement with a workpiece 14 secured by a chuck 15 to a rotatable table 16 which is operatively connected to a main drive motor 18 by conventional gearing (not shown).

Movements of the saddle 4 and ram 8 are controlled, as hereinafter described, by a tracer valve 20 carried by the ram 8 and having a plunger or stylus 22 engaged with a template 24 carried by the frame 2.

The novel control system is shown in Figure 2 and comprises a hydraulic pump 26, the suction side of which is connected to a reservoir 28. The discharge side of the pump is connected to an adjustable pressure control or relief valve 30 and is also connected to a rate or flow control valve 32 comprising a casing 34 with a stem 36 threaded therein to adjust the rate of flow of fluid from the pump 26 through the valve 32.

The valve 32 comprises an outlet line 38 having a branch line 40, both of said lines being connected to a casing 42 of the before mentioned tracer valve 20 which is diagrammatically illustrated in Figure 2. The casing 42 contains a plunger or stem 44 having spools 46, 48, 50, 52 and 54 slidably fitted within a complementary cylindrical bore of the casing 42 in fluid tight engagement therewith to direct flow of fluid through the tracer valve 20 as hereinafter described. The casing 42 also contains a spring 56 biasing the plunger or stem 44 to the left as seen in Figure 2.

The plunger spool 46 and the stylus 22 are interengaged as by cam means illustrated in the form of a steel ball 57 confined between complementary conical seats of the stylus 22 and spool 46, for a purpose hereinafter described in connection with the operation of the device during vertical movements of tool 13.

The tracer valve casing 42 is connected by lines 60 and 62 to a casing 64 of a conventional reversing or operating valve, generally designated 66, said casing 64 being connected to a rotary type reversible hydraulic motor 68 by branch lines 70 and 72 of a line 74 and by branch lines 76 and 78 of a line 80. The casing 64 contains a stem 82 having spools 84, 86 and 88 slidably fitted within a complementary cylindrical bore of the casing 64 in substantially fluid tight engagement therewith to reverse the flow of hydraulic fluid through lines 74 and 80 as hereinafter described in connection with the operation of the system.

The hydraulic motor 68 is connected by reduction gears 90 and 92 to the before mentioned rack and pinion mechanism 10 which actuates the ram 8 vertically within the saddle 4.

The tracer valve casing 42 is also connected to the casing 94 of another reversing or operating valve 96 by discharge lines 98 and 100, both of which communicate with the reservoir, and by a line 102 which delivers hydraulic fluid from the valve 32 through the tracer valve 20 to the valve 96. The casing 94 is connected by lines 104 and 106 to a conventional rotary type reversible hydraulic motor 108 which is connected by reduction gears 110 and 112 to the before mentioned feed screw 6 for actuating the saddle 4 horizontally toward and away from the rotational axis of the table. The valve 96 is also adapted to reverse the flow of fluid through the lines 104 and 106.

The screw 6 is connected by reduction gears 114 and 116 to a sliding contact 118 of a potentiometer generally designated 120 having a plate 121 with electrical connections at its opposite ends by leads 122 and 124, respectively, to opposite terminals of a conventional voltage supply such as, for example, a 110 volt 60 cycle, A. C. supply. The contact 118 is afforded an electrical connection by a lead 126 to a fixed contact 130 of a switch 132 having another fixed contact 134 which is afforded an electrical connection by a lead 136 to a sliding contact 138 of a conventional potentiometer 140 having a plate 142 connected at its opposite ends to the leads 122 and 124, respectively.

The switch 132 also comprises a movable contact 144 selectively engageable with the fixed contacts 130 and 134 to accomplish manual or automatic control of the system, as hereinafter described. The movable contact 144 is afforded an electrical connection by a lead 145 to an electronic error signal amplification device 146 of a conventional electronic control panel, generally designated 148, said panel also comprising relays 150 and 152 responsive to the device 146 as hereinafter described in detail. The device 146 is also afforded an electrical connection by a lead 154 to a sliding contact 156 of a conventional potentiometer 157 having a plate 158 with opposite ends thereof electrically connected to the leads 122 and 124, respectively. The electronic error signal amplification device is a conventional positioning control such as manufactured by the General Electric Corporation and the wiring diagram therefore is clearly shown in Figure 3. Referring to this figure, it is seen that the voltage potentials in lines 145 and 154 are controlled by the positioning of the sliding controls of the potentiometers 120 and 157 respectively. With the contacts 118 and 156 in different positions, a differing voltage potential will occur in the lines 145 and 154 and this differing potential is sensed and amplified by the error signal amplification device whereby energization of the coil of either relay 150 or 152 will take place. The relay which is energized depends on the direction of the potential or, in other words, on whether the voltage is greater or less in line 145 than in line 154. Energization of the relay 150 or 152 closes the related contacts 150A or 152A for a purpose to be described hereinafter in conjunction with the operational description of the invention.

The contact 156 of the potentiometer 157 is keyed to a shaft 160 which is rotated by the armature of a conventional reversible electrical motor 162 having a lead 166 connected to the before mentioned main lead 124, said motor having leads 168 and 170 connected to the before mentioned relays 150 and 152 which are also connected by branch lines 169 and 171 respectively to the before mentioned main lead 122, whereby closing of relay 150 establishes an electric circuit through motor leads 166 and 170 to rotate the shaft 160 in one direction and closing of relay 152 establishes an electric circuit through motor leads 166 and 168, thereby rotating the shaft 160 in the opposite direction for a purpose hereinafter described in connection with the operation of the system.

The motor shaft 160 is also keyed to a sliding contact 172 of a conventional field rheostat, generally designated 174, having a plate 176 connected at one end to a main lead 177 of a conventional voltage supply such as, for example, a 230 volt, D. C. generator (not shown), and the opposite end of the rheostat plate 176 is connected to one end of a motor field resistance 178, the opposite end of which is connected to the other main lead 179 of the voltage supply for the armature 180 of the before mentioned main table drive motor 18 (Figure 1). A shunt 212 connects the main lead 177 to the wiper 172.

The shaft 160 is also keyed to an armature 182 of a conventional selsyn motor, generally designated 184, which is connected by branch leads 186 and 188 to the before mentioned leads 122 and 124, respectively. Selsyn motor 184 is arranged in series with another selsyn motor, generally designated 190, connected by branch leads 192 and 194 to the main leads 122 and 124, respectively. The selsyn motor 190 comprises an armature 196 keyed to a shaft 198 of a reduction gear 200 which is meshed with another reduction gear 202 keyed to the before mentioned stem 36 for threading the latter outwardly or inwardly of the casing 34 of the flow control valve 32 for the purpose of increasing or decreasing the rate of hydraulic flow through said valve 32 as hereinafter described in connection with the action of the system.

Describing the operation of the novel system and assuming that the components thereof are in the positions illustrated in the drawings, hydraulic fluid from the reservoir 28 is delivered by the pump 26 to the valve casing 34 at an adjustable pressure depending upon the adjustment of the valve 30 which exhausts fluid to the reservoir 28 to maintain the desired pressure value. Flow of fluid from the pump 26 through the valve casing 34 is at a rate determined by the setting of the threaded stem 36, and under the conditions shown in Figure 2, such hydraulic fluid passing through the valve casing 34 flows through line 38 between spools 52 and 54 into the line 102 and thence into line 104 rotating the hydraulic motor 108 at a rate dependent upon the setting of the flow control valve stem 36 to drive the feed screw 6, thereby moving the saddle 4 and the tool 13 toward the rotational axis of the table.

Rotation of the screw 6 also rotates the sliding contact at 118 of the potentiometer 120 to an out-of-correspondence relationship with the corresponding contacts 138 and 156 of the potentiometers 140 and 157. Assuming for the moment that movable contact 144 of switch 132 has been actuated to engage contact 130 thereof for the purpose of accomplishing automatic operation of the system, the before mentioned movement of the potentiometer contact 118 by the feed screw 6 causes the device 146 to set up and amplify an error signal between lines 145 and 154, thereby closing the contacts of relay 150 and energizing the motor 162 by establishing an electrical circuit through the motor 162 and through motor leads 170 and 166 to rotate the potentiometer contact 156 to the same relative position as the contact 118 now occupies with respect to its plate 121.

This rotation of potentiometer contact 156 by the shaft 160 of motor 162 also rotates the sliding contactor 172 of the field rheostat 174, thereby increasing flowing current through the armature 180 between its leads 177 and 179, thereby increasing the rotational speed of the table to maintain a constant cutting rate, inasmuch as movement of the screw 6 has moved the tool 13 closer to the rotational axis of the table.

Rotation of the shaft 160, as above described, to increase the rotational speed of the table also rotates armature 182 of selsyn motor 184 which automatically results in a corresponding rotation of the armature 196 of the selsyn motor 190, whereupon the armature shaft 198 rotates gears 200 and 202 to thread the stem 36 outwardly of its casing 34, thereby increasing the rate of hydraulic flow through the valve 32 to the motor 108 and consequently increasing the feed rate of the tool 13 toward the rotational axis of the table.

This increase in feed rate in turn results in further increase of the speed of table rotation which causes further increase in the feed rate, etc.

The stylus 22 is illustrated at its slightly deflected neutral position which is exaggerated in Figure 2 to clarify the illustration. Under these conditions the valve stem 44 is also in neutral position so that the tool 13 moves horizontally without any vertical movement thereof toward the rotational axis of the table as above described. If the tool feed mechanism moves the tracer valve 20 so that the stylus 22 tends to rise off the template 24, the reduced deflection of the stylus under such conditions allows the valve stem 44 to move slightly outwardly toward the template 24. The flow of oil through the valve is then altered as hereinafter described to correct such movement of the valve 20 away from the template. On the other hand, if the valve tends to dive into the template, the resulting increased deflection of the stylus 22 causes the valve stem 44 to be pushed farther inwardly away from the template 24 beyond the neutral position shown in Figure 2, thereby causing the hydraulic fluid from pump 26 to flow in such direction as to cause the valve 20 to rise upwardly as hereinafter described. In this connection it should be emphasized that the valve 20 and tool 13 are both carried by the ram 8 so that the tool and valve rise and fall together. Thus when the valve 20 and tool 13 are following the template 24 correctly the stylus 22 remains deflected a few thousandths of a inch and holds the valve stem near the neutral position thereof, so that a sudden deflection of the stylus 22 will cause the tool 13 to rapidly rise and fall until it has recovered from the disturbance.

Upward movement of the stylus 22 in response to a rise in the engaged surface of the template 24 urges the stem 44 inwardly of the casing 42 against the resistance of spring 56 to diminish or entirely cut off flow of hydraulic fluid from the control valve 32 to the valve 96 which supplies the actuating fluid for the feed screw motor 108. Simultaneously this inward movement of the stem 44 accommodates flow of hydraulic fluid from the line 40 to the line 62 and thence to branch line 78 of line 80, rotating the hydraulic motor 68 to actuate the ram 8 and tool 13 upwardly to correspond with the rise of the template surface with which the stylus 22 is engaged. It may be noted that hydraulic fluid under these conditions flows from the motor 68 through the line 74 and branch line 70 thereof and thence through line 60 to line 100 which as above noted is open to exhaust into the reservoir 28.

Downward movement of the stylus 22 in response to its engagement with a fall in the surface of template 24 accommodates movement of the tracer valve stem 44 outwardly under the impulse of the spring 56, so that the spool 54 diminishes or entirely cuts off flow of fluid to the line 102 which supplies actuating fluid to the hydraulic motor 108 in the illustrated setting of valve 96. At the same time flow of fluid from the line 40 is accommodated to the line 60 and thence to branch line 70 of line 74 which supplies fluid to the hydraulic motor 68 to urge the ram downwardly an amount corresponding to the downward movement of the stylus 22 along the engaged template surface. Under these conditions hydraulic fluid is exhausted from motor 68 through line 80, branch line 78, line 62, through the bore of casing 42, and into line 98 which as above noted is also to discharge into the reservoir 28.

Thus it will be understood that the tool 13 moves toward and away from the axis of the table 16 and also moves upwardly and downwardly to accomplish the machining of irregular contours in accordance with the configuration of the template 24 along which the stylus 22 of the tracer valve passes. Motion of the tool 13 toward the rotational axis of the table is accomplished by acceleration of table rotation and also by an increase in the rate of tool feed to accomplish both a constant rate of metal removal and also a constant feed per revolution relationship.

It may be noted that the stem 82 of valve 66 may be actuated inwardly to a reverse position, to permit tracing action of the stylus 22 with the template 24 mounted above the stylus in a manner well known to those skilled in the art. Also the valve 96 may be similarly reversed so that flow of fluid to the hydraulic motor 108 causes the saddle 4 to move to the right as seen in Figure 2 rather than to the left as previously described.

It may be noted that if desired the movable contact 144 of switch 132 may be engaged with the fixed contact 134 thereof to accommodate manual control of table speed and tool feed rate by the manually operable potentiometer 140.

With the movable contact 144 engaged with the fixed contact 134 the machine operator may rotate the contact 138 by means of a hand knob 210 to operate the control system in the same manner as occurs when contact 118 is rotated through rotation of the screw 6. The manual operation is, of course, not as accurate as the automatic operation, because the rate of rotation of contact 138 by means of knob 210 is determined solely by the experience of the machine operator in visually attempting to correlate feeds and table speeds.

We claim:

1. In a control system for a machine having a table rotatable on an axis and having a tool holder movable toward and away from said axis; the combination of a rotatable member operatively connected to the tool holder for so moving the latter, a rotatable hydraulic motor operatively connected to said member for rotating the latter, electrical motor means for rotating the table; means for controlling the speed of said electrical motor means comprising a rheostat having a rotatable contact, means responsive to rotation of said member in a direction to move the holder toward said axis for automatically rotating said contact to increase the rotational speed of the table, a selsyn motor having an armature keyed to said contact for rotation therewith, another selsyn motor electrically connected in series with the first mentioned selsyn motor and having an armature movable in unison with the first mentioned armature, and means operatively connected to the second mentioned armature for increasing the flow rate of hydraulic fluid to said hydraulic motor in response to increase of the rotational speed of the table.

2. A control system according to claim 1, wherein the last mentioned means are characterized by a throttle valve having a stem operatively connected to the armature of the second mentioned selsyn motor, and pump means are provided for delivering hydraulic pressure fluid to said throttle valve, said throttle valve being connected to the hydraulic motor.

3. In a control system for a boring mill having a horizontally movable saddle carrying a vertically movable ram with a tool to engage a workpiece on a table rotatable on a substantially vertical axis; the combination of a horizontal feed screw operatively connected to the saddle for actuation thereof, a hydraulic motor operatively connected to the feed screw for rotating the same to move the saddle toward and away from the rotational axis of the table, a potentiometer having a sliding contact operatively connected to the screw for related movement therewith, a motor control shaft, a reversible motor operatively connected to the control shaft for rotating the shaft in one or the other direction in response to the directional movement of said sliding contact, another potentiometer having a sliding contact operatively connected to the shaft, said second mentioned potentiometer causing the stopping of said reversible motor when the sliding contacts have moved to corresponding positions, a rheostat having a sliding contact operatively connected to the shaft, a main drive motor for rotating the table, said drive motor being electrically connected to said rheostat for control thereby, a selsyn motor having an armature connected to the shaft for movement therewith, another selsyn motor in series with the first mentioned motor and having an armature movable in response to the movement of said first mentioned armature, and means controlled by said last mentioned armature for delivering hydraulic fluid to the hydraulic motor at a rate directly proportional to the rotational speed of the table.

4. A system according to claim 3, wherein the last mentioned means comprise a flow control valve having a stem operatively connected to the last mentioned armature, said valve having a hydraulic connection with the hydraulic motor to deliver hydraulic fluid thereto, and a source of hydraulic pressure fluid connected to said flow control valve for delivering hydraulic fluid therethrough to said hydraulic motor.

5. In a control system for a boring mill having a horizontally movable saddle carrying a vertically movable ram with a tool to engage a workpiece on a table rotatable on a substantially vertical axis, the combination of a reversible rotary hydraulic motor, a feed screw operatively connected to said motor for rotation thereby, said screw being operatively connected to the saddle for actuating the latter in response to rotation of the hydraulic motor, means responsive to rotation of the screw in a direction to urge the tool toward said axis of automatically increasing the rotational speed of the table, and means automatically responsive to said rotation of the screw for automatically increasing the rate at which hydraulic fluid is delivered to said hydraulic motor, said last mentioned means comprising a flow control valve operatively connected to the screw for increasing flow of fluid through the valve in response to said rotation of the screw, whereby the tool will be moved toward said axis at an accelerating rate, a source of pressure fluid connected to the valve for delivering fluid thereto, a tracer valve connected to the flow control valve and connected to the hydraulic motor for delivering fluid thereto from the flow control valve, a stylus associated with said tracer valve and engageable with an associated template, said stylus in neutral position thereof accommodating unrestricted flow of fluid from the tracer valve to the hydraulic motor, and said stylus upon movement thereof upwardly or downwardly from said neutral position thereof actuating said tracer valve to restrict flow of fluid to said hydraulic motor, another hydraulic motor operatively connected to the ram for moving the latter upwardly or downwardly, and hydraulic connections between the tracer valve and said other hydraulic motor for actuating the ram in response to vertical displacement of the stylus from its neutral position.

6. In a control system for a boring mill having a horizontally movable saddle carrying a vertically movable ram with a tool adapted to engage a workpiece on a table rotatable on a substantially vertical axis; the combination of a horizontal feed screw operatively connected to the saddle for actuation thereof, a hydraulic motor operatively connected to the feed screw for rotating the same to move the saddle toward and away from the rotational axis of the table, a control shaft, a rheostat having a sliding contact operatively connected to the shaft, a variable speed main drive motor for rotating the table on said axis, said rheostat being operatively connected to said main drive motor for varying the speed thereof, a selsyn motor having an armature connected to the shaft, another selsyn motor in series with the first mentioned motor and having an armature, means controlled by the last mentioned armature for delivering hydraulic fluid to the hydraulic motor at a rate directly proportional to the rotational speed of the table, and means for rotating the shaft to simultaneously increase the rotational speed of the table and the flow rate of hydraulic fluid to the hydraulic motor.

7. In a control system for a boring mill having a horizontally movable saddle carrying a vertically movable ram with a tool to engage a workpiece on a table rotatable on a substantially vertical axis; the combination of a horizontal feed screw operatively connected to the saddle for actuation thereof, a hydraulic motor operatively connected to the feed screw for rotating the same to move the saddle toward and away from the rotational axis of the table, a control shaft, a rheostat having a sliding contact operatively connected to the shaft for rotation thereby, a variable speed main drive motor operatively connected to the table for rotating the latter on said axis, said rheostat being electrically connected to the main drive motor for varying the speed thereof and thereby varying the rotational speed of the table, a selsyn motor having an armature connected to the shaft for rotation thereby, another selsyn motor electrically connected in series with the first mentioned motor and having an armature rotatable in unison with the first mentioned armature, means controlled by the second mentioned armature for delivering hydraulic fluid to the hydraulic motor at a variable flow rate to control the rotational speed of the feed screw, and means for rotating the shaft to simultaneously increase the rotational speed of the table and the flow rate of hydraulic fluid to the hydraulic motor.

8. In a control system for a boring mill having a horizontally movable saddle carrying a vertically movable ram with a tool to engage a workpiece on a table rotatable on a substantially vertical axis; the combination of a reversible rotary hydraulic motor, a feed screw operatively connected to said motor for rotation thereby, said screw being operatively connected to the saddle for actuating of the saddle toward and away from said axis in response to rotation of the hydraulic motor in opposite directions respectively, means responsive to such actuation of the saddle for automatically regulating the rotational speed of the table in indirect proportion to the distance of the tool from said axis, means operatively connected to the table for automatically regulating the rate at which hydraulic fluid is delivered to said hydraulic motor, said last mentioned means comprising a flow control valve for regulating flow of hydraulic fluid therethrough in direct proportion to the rotational speed of the table, whereby as the table speed increases, the feed rate of the tool carrying saddle will be proportionally increased, a source of pressure fluid connected to the valve for delivering fluid thereto, a tracer valve connected to the flow control valve for delivering fluid therefrom, a reversing valve connected to the tracer valve and to the hydaulic motor for delivering fluid from the tracer valve to the hydraulic motor, a stylus associated with said tracer valve and engageable with an associated template, said stylus in neutral position thereof accommodating unrestricted flow of fluid from the tracer valve to the reversing valve, and said stylus upon movement thereof upwardly and downwardly from said neutral position actuating said tracer valve to restrict flow of fluid to said reversing valve, another hydraulic motor operatively connected to the ram for moving the latter upwardly and downwardly, and hydraulic connections between the tracer valve and said other hydraulic motor for actuating the ram in response to vertical displacement of the stylus from its neutral position.

9. In a control system for a boring mill having a horizontally movable saddle carrying a vertically movable ram which is provided with a tool to engage a workpiece on a table rotatable on a substantially vertical axis; the combination of a reversible rotary hydraulic motor, a feed screw operatively connected to said motor for rotation thereby, said screw being operatively connected to the saddle for actuating the latter toward and away from said axis in response to rotation of the hydraulic motor in opposite directions respectively, a control shaft, a rheostat having a sliding contact operatively connected to the shaft, a variable speed main drive motor for rotating the table on said axis, said rheostat being operatively connected to said main drive motor for varying the speed thereof, a selsyn motor having an armature connected to the shaft, another selsyn motor in series with the first mentioned selsyn motor and having an armature, a flow control valve operatively connected to the second mentioned selsyn motor for actuation thereby to increase or decrease flow of fluid through the valve in response to rotation of the screw to move the saddle toward and away from said axis, respectively, a source of hydraulic pressure fluid connected to the valve for delivering said fluid thereto, a tracer valve connected to the flow control valve for delivering said fluid therefrom, said tracer valve being connected to the hydraulic motor for delivering fluid from the tracer valve to the hydraulic motor, a stylus associated with said tracer valve and engageable with an associated template, said stylus in neutral position thereof accommodating unrestricted flow of fluid from the tracer valve to the hydraulic motor and said stylus upon movement thereof upwardly or downwardly from said neutral position thereof actuating said tracer valve to restrict flow of fluid to said hydraulic motor, another hydraulic motor operatively connected to the ram for moving the latter upwardly and downwardly, hydraulic connections between the tracer valve and said other hydraulic motor for actuating the ram in response to vertical displacement of the stylus from its neutral position, and means operatively connecting the screw to the shaft for rotating the latter to simultaneously vary the rotational speed of the table and the feed rate of the tool in response to variations in the distance of the tool from said axis.

10. In a control system for a machine having a table rotatable on an axis and having a tool holder movable toward and away from said axis; the combination of a rotary hydraulic motor operatively connected to the holder for moving the latter toward and away from said axis, means operatively connected to said holder for automatically increasing the rotational speed of the table as the holder moves toward said axis and for automatically decreasing the speed of the table as the holder moves away from said axis, and means operatively connected to the holder for automatically increasing the rate of flow of hydraulic fluid to said motor as the holder moves toward said axis and for automatically decreasing the rate of flow of hydraulic fluid to said motor as the holder moves away from said axis, said last mentioned means comprising a throttle valve for delivering hydraulic fluid to said hydraulic motor and a pump for delivering hydraulic fluid to the throttle valve, said throttle valve having a stem rotatable in one direction to decrease the rate of hydraulic fluid flow therethrough and rotatable in the opposite direction to increase the rate of flow of hydraulic fluid therethrough, a selsyn motor having an armature operatively connected to said stem for rotating the same, another selsyn motor electrically connected in series with the first mentioned selsyn motor and having an armature, a rheostat having a rotary contact keyed with respect to the last mentioned armature and an electrical motor operatively connected to the table for rotating the same, said motor being operatively connected to the rheostat, whereby rotation of the contact in one direction decreases the rotational speed of the motor and simultaneously decreases the flow of hydraulic fluid through the throttle valve and rotation of the contact in the opposite direction increases the rotational speed of the electric motor and simultaneously increases the rate of flow of hydraulic fluid through the throttle valve.

References Cited in the file of this patent

UNITED STATES PATENTS

| | | |
|---|---|---|
| 2,068,890 | Sassen | Jan. 26, 1937 |
| 2,120,196 | Wright | June 7, 1938 |
| 2,389,368 | King | Nov. 20, 1945 |
| 2,475,326 | Johnson | July 5, 1949 |
| 2,498,272 | Herchenroeder | Feb. 21, 1950 |
| 2,527,458 | Schurr | Oct. 24, 1950 |
| 2,557,824 | Hornfeck | June 19, 1951 |
| 2,586,183 | Stewart | Feb. 19, 1952 |